(12) United States Patent
Yoo et al.

(10) Patent No.: US 8,672,386 B2
(45) Date of Patent: Mar. 18, 2014

(54) SEAT LATCH STRUCTURE

(75) Inventors: Jong Moon Yoo, Gunpo-si (KR); Tae Hoon Lee, Hwaseong-si (KR); Tae Hyung Kim, Gunpo-si (KR); Won Gyu Kang, Ulsan (KR); Byung Yong Choi, Hwaseong-si (KR); Jong Kweon Pyun, Suwon-si (KR); Wan Hyun Kim, Daegu (KR); Jin Woo Kim, Daegu (KR); Su Jin Jung, Daegu (KR); Seong Tae Hong, Suwon-si (KR)

(73) Assignees: Hyundai Motor Company, Seoul (KR); Kia Motors Corporation, Seoul (KR); Pyeonghwa Automotive, Daegu (KR)

( * ) Notice: Subject to any disclaimer, the term of this patent is extended or adjusted under 35 U.S.C. 154(b) by 182 days.

(21) Appl. No.: 13/210,087

(22) Filed: Aug. 15, 2011

(65) Prior Publication Data

US 2012/0080928 A1   Apr. 5, 2012

(30) Foreign Application Priority Data

Sep. 30, 2010   (KR) ........................ 10-2010-0095547

(51) Int. Cl.
*B60N 2/04*      (2006.01)
*E05C 3/04*      (2006.01)

(52) U.S. Cl.
USPC ....................................... 296/65.03; 292/216

(58) Field of Classification Search
USPC ................. 296/65.03, 65.05, 65.01; 297/336, 297/378.13; 292/216, 336, DIG. 55, 292/DIG. 56, DIG. 73
See application file for complete search history.

(56) References Cited

U.S. PATENT DOCUMENTS

| | | | | |
|---|---|---|---|---|
| 4,703,961 A | * | 11/1987 | Weinerman et al. | 292/216 |
| 5,141,266 A | * | 8/1992 | Braun et al. | 292/49 |
| 5,439,260 A | * | 8/1995 | Weinerman et al. | 292/48 |
| 5,595,076 A | * | 1/1997 | Weinerman et al. | 70/208 |
| 6,471,260 B1 | * | 10/2002 | Weinerman et al. | 292/216 |
| 7,762,605 B2 | | 7/2010 | Otsuka et al. | |

(Continued)

FOREIGN PATENT DOCUMENTS

| | | |
|---|---|---|
| JP | 11107600 A | 4/1999 |
| KR | 20-1999-0020356 U | 6/1999 |

(Continued)

*Primary Examiner* — Glenn Dayoan
*Assistant Examiner* — Gregory Blankenship
(74) *Attorney, Agent, or Firm* — Morgan, Lewis & Bockius LLP

(57) ABSTRACT

A seat latch structure is provided, which includes a base bracket mounted on a seat for a vehicle and having a first insertion hole and a second insertion hole formed thereon and an opening which is formed on one side thereof and into which a striker fixed to a vehicle body is inserted, a claw having a first through-hole formed thereon to correspond to the first insertion hole and a locking groove formed on one side thereof, a pawl provided on one side of the claw and having a second through-hole formed thereon to correspond to the second insertion hole, a first rotating shaft and a second rotating shaft inserted into the first through-hole of the claw and the second through-hole of the pawl, respectively, and a double torsion spring connecting the first through-hole and the second through-hole into which the first rotating shaft and the second rotating shaft are inserted, respectively. According to the seat latch structure, the noise generated during the operation of the seat latch is reduced and the operating force is increased to improve the merchantability.

3 Claims, 6 Drawing Sheets

(56) References Cited

U.S. PATENT DOCUMENTS

| | | | |
|---|---|---|---|
| 8,075,027 B2* | 12/2011 | Zweibohmer | 292/216 |
| 8,226,169 B2* | 7/2012 | Kreuels et al. | 297/378.13 |
| 2005/0104384 A1 | 5/2005 | Kondo et al. | |
| 2005/0173939 A1 | 8/2005 | Bonk | |
| 2005/0269854 A1* | 12/2005 | Lutzka et al. | 297/378.13 |
| 2007/0222250 A1* | 9/2007 | Miller et al. | 296/65.03 |
| 2008/0217929 A1* | 9/2008 | Zweibohmer | 292/216 |
| 2012/0080928 A1* | 4/2012 | Yoo et al. | 297/463.1 |

FOREIGN PATENT DOCUMENTS

| | | |
|---|---|---|
| KR | 20-0282335 Y1 | 7/2002 |
| KR | 100872993 B1 | 12/2008 |
| KR | 1020090109682 A | 10/2009 |

* cited by examiner

SEAT LATCH STRUCTURE

CROSS-REFERENCE TO RELATED APPLICATION

This application is based on and claims priority from Korean Patent Application No. 10-2010-0095547 filed Sep. 30, 2010, the entire contents of which application is incorporated herein for all purposes by this reference.

BACKGROUND OF INVENTION

1. Field of Invention

The present invention relates to a seat latch structure, and more particularly, to a seat latch structure, which can reduce noise generated during the operation of a latch of a seat for a vehicle and increase the operating force thereof.

2. Description of Related Art

In general, a seat latch for a vehicle is a device for fastening/unfastening a vehicle seat to/from a vehicle body.

Such a seat latch for a vehicle is required to operate smoothly in various fastening conditions together with providing of convenience in operation. Particularly, in the case where the seat is fastened to the vehicle body, it is required to securely maintain the fastening state even if impact is applied to the vehicle body.

In order to satisfy the above-described requirements, researches and developments have been made in the related art. For a seat latch for a vehicle already used, a technique of using a base plate, a latch rotatably engaged with the base plate, and a pawl that interacts with the latch has been developed.

FIGS. 1(a) and 1(b) are views illustrating a seat latch structure in the related art. The seat latch structure in the related art, as illustrated in FIGS. 1(a) and 1(b), includes a base bracket 10 in the form of a panel, a claw 20 rotatably provided on the bracket 10, a pawl 30 rotatably provided on the bracket 10, fixing pins 40 fixing the claw 20 and the pawl 30 to the base bracket 10, respectively, and a spring 50 connecting the fixing pins 40.

In the seat latch structure as constructed above in the related art, if a striker is mounted to fix the seat, the claw 20 provided on the base bracket 10 is rotated to fix the striker, and the pawl 30 provided on one side of the claw 20 serves to fix/release the claw 20 during the fixing/releasing of the striker.

In this case, the spring 50, which provides an elastic force to make the claw 20 and the pawl 30 operate, generates an operation force for fixing/releasing of the striker.

However, the above-described seat latch structure in the related art has the problem that if tolerance occurs between the claw and the pawl mounted on the base bracket, a gap occurs between them, and this may cause noise generation and deterioration of the operation force during the operation of the seat latch.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made to address the above-mentioned problems occurring in the prior art while advantages achieved by the prior art are maintained intact.

Various aspects of the present invention provide for a seat latch structure which can reduce noise generated during the operation of a seat latch for a vehicle and increase the operating force thereof.

In one aspect of the present invention, there is provided a seat latch structure, which includes a base bracket mounted on a seat for a vehicle and having a first insertion hole and a second insertion hole formed thereon and an opening which is formed on one side thereof and into which a striker fixed to a vehicle body is inserted, a claw having a first through-hole formed thereon to correspond to the first insertion hole and a locking groove formed on one side thereof, a pawl provided on one side of the claw and having a second through-hole formed thereon to correspond to the second insertion hole, a first rotating shaft and a second rotating shaft inserted into the first through-hole of the claw and the second through-hole of the pawl, respectively, and a double torsion spring connecting the first through-hole and the second through-hole into which the first rotating shaft and the second rotating shaft are inserted, respectively.

As described above, according to the seat latch structure according to various aspects of the invention, noise generated during the operation of the seat latch is reduced and the operating force is increased to improve the merchantability.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
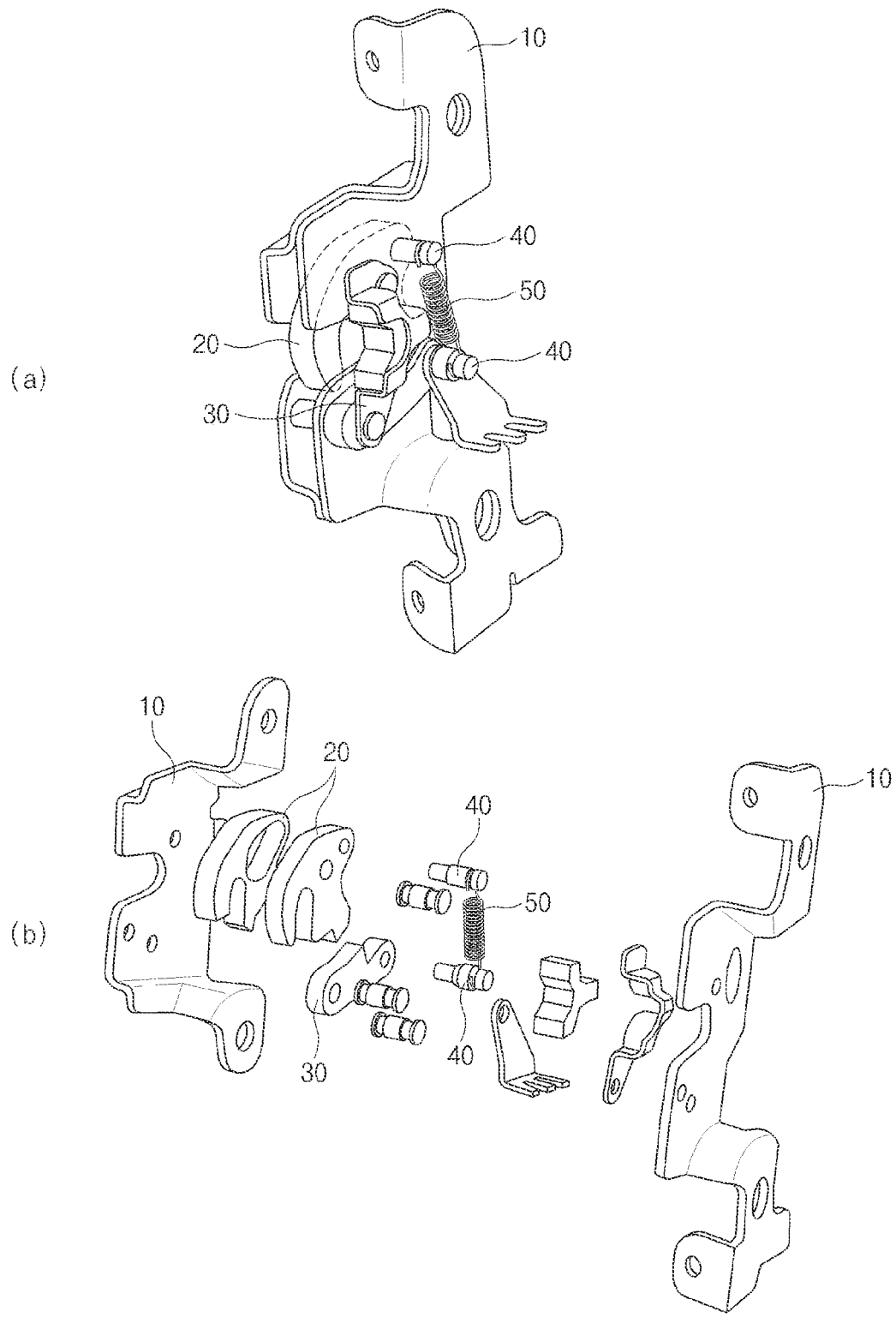
FIGS. 1(a) and 1(b) are perspective and exploded perspective views illustrating a seat latch structure in the related art.
Figure 2:
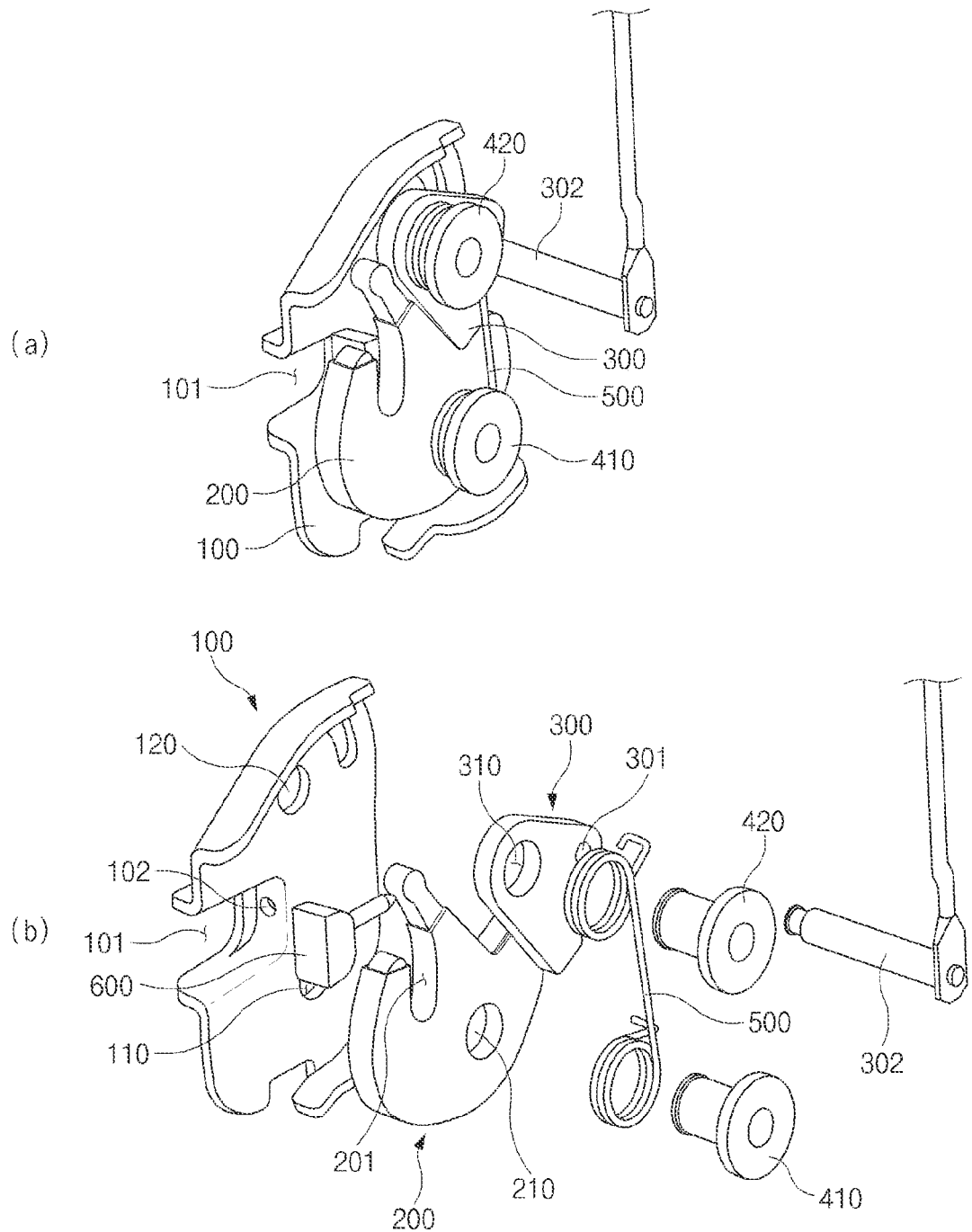
FIGS. 2(a) and 2(b) are perspective and exploded perspective views illustrating an exemplary seat latch structure according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A seat latch structure according to various embodiments the present invention, as illustrated in FIGS. 2(a) to 6(b), a claw 200 and a pawl 300 are rotatably mounted on a base bracket 100 around a first rotating shaft 410 and a second rotating shaft 420, respectively, and a double torsion spring 500 is connected between the first rotating shaft 410 and the second rotating shaft 420 to reduce noise.

Hereinafter, respective constituent elements of the seat latch structure according to various embodiments the present invention will be described with reference to the accompanying drawings.

In various embodiments of the present invention, it is assumed that a latch is mounted on a seat frame, and a striker is a seat-mount type seat latch mounted on a vehicle body.

As illustrated in FIGS. 2(a) and 2(b), the base bracket 100 is in the form of a panel having a flange formed thereon, and is mounted on a seat for a vehicle. On one side of the base bracket 100, an opening 101 is formed, and a striker that is fixed to a vehicle body is inserted into the opening 101.

Also, a first insertion hole 110 is formed at a lower end of the base bracket 100, and a second insertion hole 120 is formed at an upper end thereof to enable a claw 200 and a pawl 300 to be described later to be rotated.

The claw 200 is rotatably mounted on the base bracket 100. A first through-hole 210 is formed in the center of the claw 200 to correspond to the first insertion hole of the base bracket 100.

In this case, a locking groove 201 that is formed by a projection portion is formed on one side of the claw 200 to correspond to the opening 101 of the base bracket 100. If the claw 200 is rotated, the striker that is inserted into the opening 101 can be fixed.

As illustrated in FIGS. 4(a) to 5(b), a mounting hole 102 is formed on the inside of the opening 101 of the base bracket 100, and a damper 600 of a rubber material is inserted into the mounting hole 102. The damper 600 is positioned between the opening 101 of the base bracket 100 and the locking groove 201 of the claw 200, and when the striker S is inserted, the damper 600 is deformed to press the claw 200, and thus the claw 200 is prevented from moving within a gap.

As illustrated in FIGS. 2(a) and 2(b), the pawl 300 is provided on one side of the claw 200, and is rotatably mounted on the base bracket 100. A second through-hole 310 is formed on one side of the pawl 300 to correspond to the second insertion hole 120 of the base bracket 100.

As described above, the pawl 300 is rotatably provided on one side of the claw 200, and fixes or releases the claw 200 during the fixing/releasing of the striker.

Also, a connection hole 301 is formed on one side of the pawl 300, and a release wire 302 can be inserted into the connection hole 301 to enable the pawl 300 to be rotated.

On the other hand, a first rotating shaft 410 and a second rotating shaft 420 are provided to enable the claw 200 and the pawl 300 to be rotated. The first rotating shaft 410 is inserted into the first through-hole 210, and is fastened to the first insertion hole 110 of the base bracket 100. The second rotating shaft 420 is inserted into the second through-hole 310 of the pawl 300, and is fastened to the second insertion hole 120 of the base bracket 100.

A double torsion spring 500 is composed of two springs connected together. The double torsion spring 500 is inserted into the first rotating shaft 410 and the second rotating shaft 420, which are inserted into the first through-hole 210 of the claw 200 and the second through-hole 310 of the pawl 300, and during the fixing/releasing of the striker, it generates the operation force of the claw 200 and the pawl 300.

Hereinafter, the operation and the effect of the seat latch structure according to various embodiments the present invention will be described.

As illustrated in FIGS. 2(a) and 2(b), according to the seat latch structure according to various embodiments the present invention, the claw 200 and the pawl 300 are rotatably mounted on the base bracket 100 around the first rotating shaft 410 and the second rotating shaft 420, respectively, and the double torsion spring 500 is provided to connect the first rotating shaft 410 and the second rotating shaft 420. The latch is mounted on the seat of the vehicle, and the striker is mounted on the vehicle body.

In this case, the pawl 300 is rotatably provided on one side of the claw 200, and during the fixing/releasing of the striker, it fixes/releases the claw 200. On one side of the pawl 300, the connection hole 301 is formed, and the release wire 302 is inserted into the connection hole 301 to enable the pawl 300 to be rotated.

Figure 3:
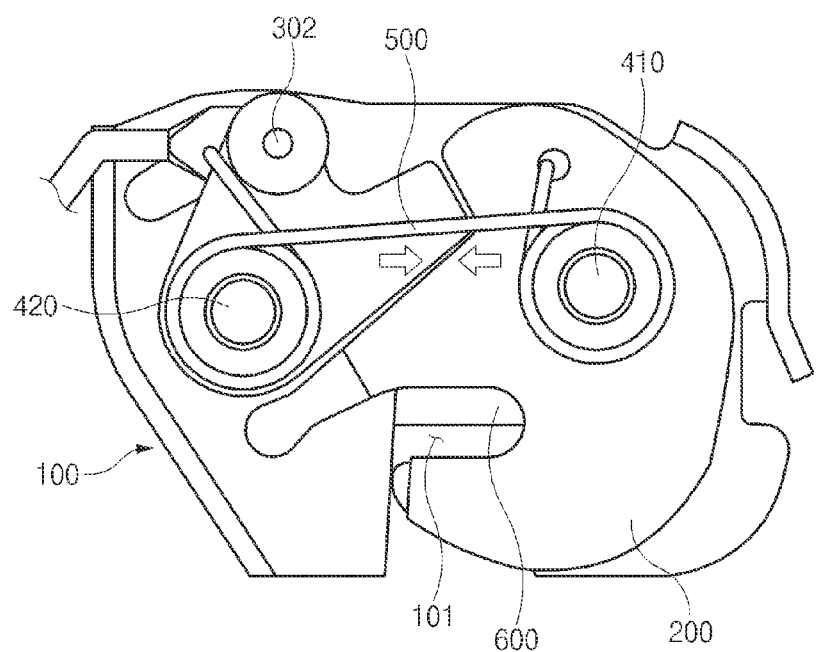
FIG. 3 is a cross-sectional view illustrating a seat latch structure according to the present invention.
Figure 4:
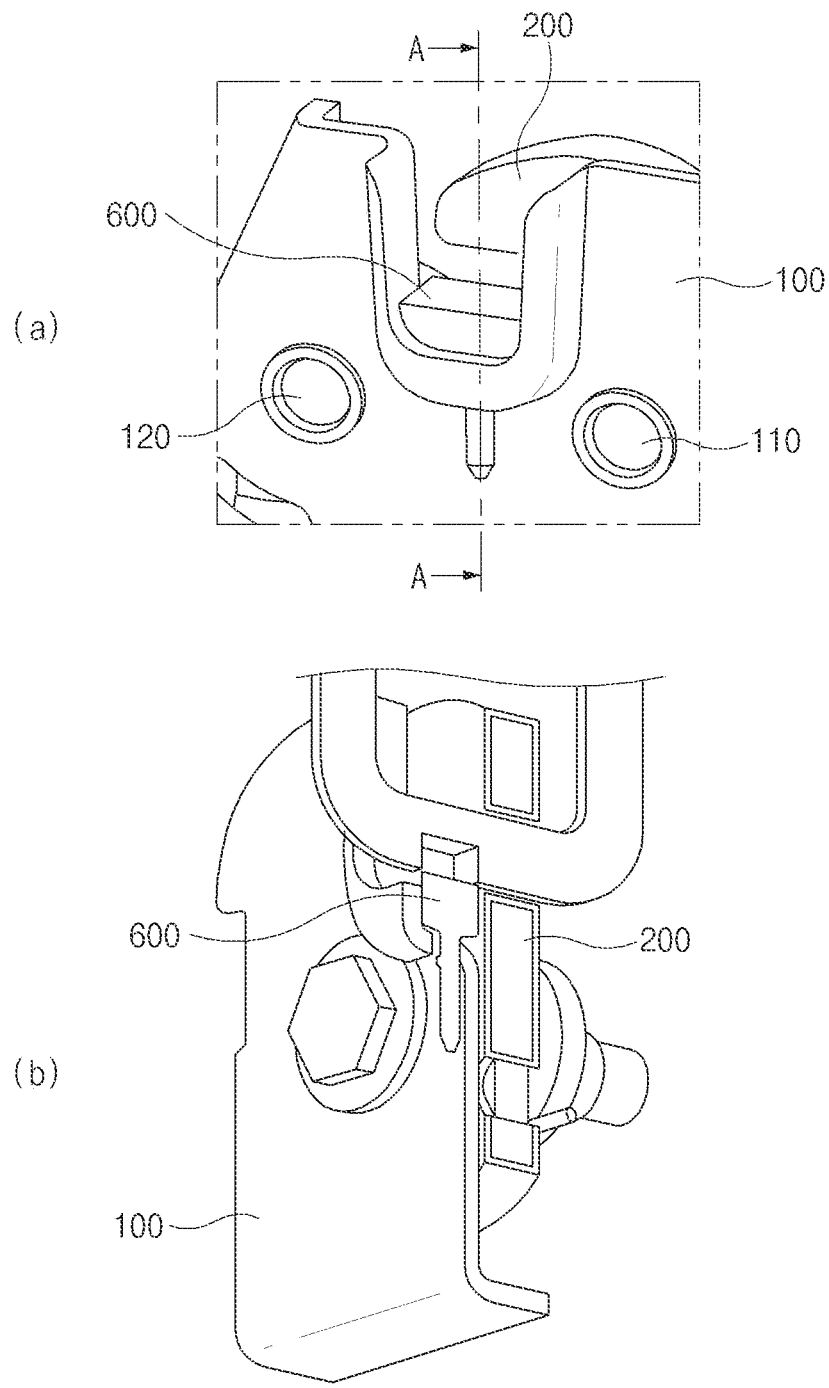
FIG. 4(a) is a view illustrating a main part of a base bracket in a seat latch structure according to the present invention.
FIG. 4(b) is a view taken along line A-A of FIG. 4(a).
Figure 5:
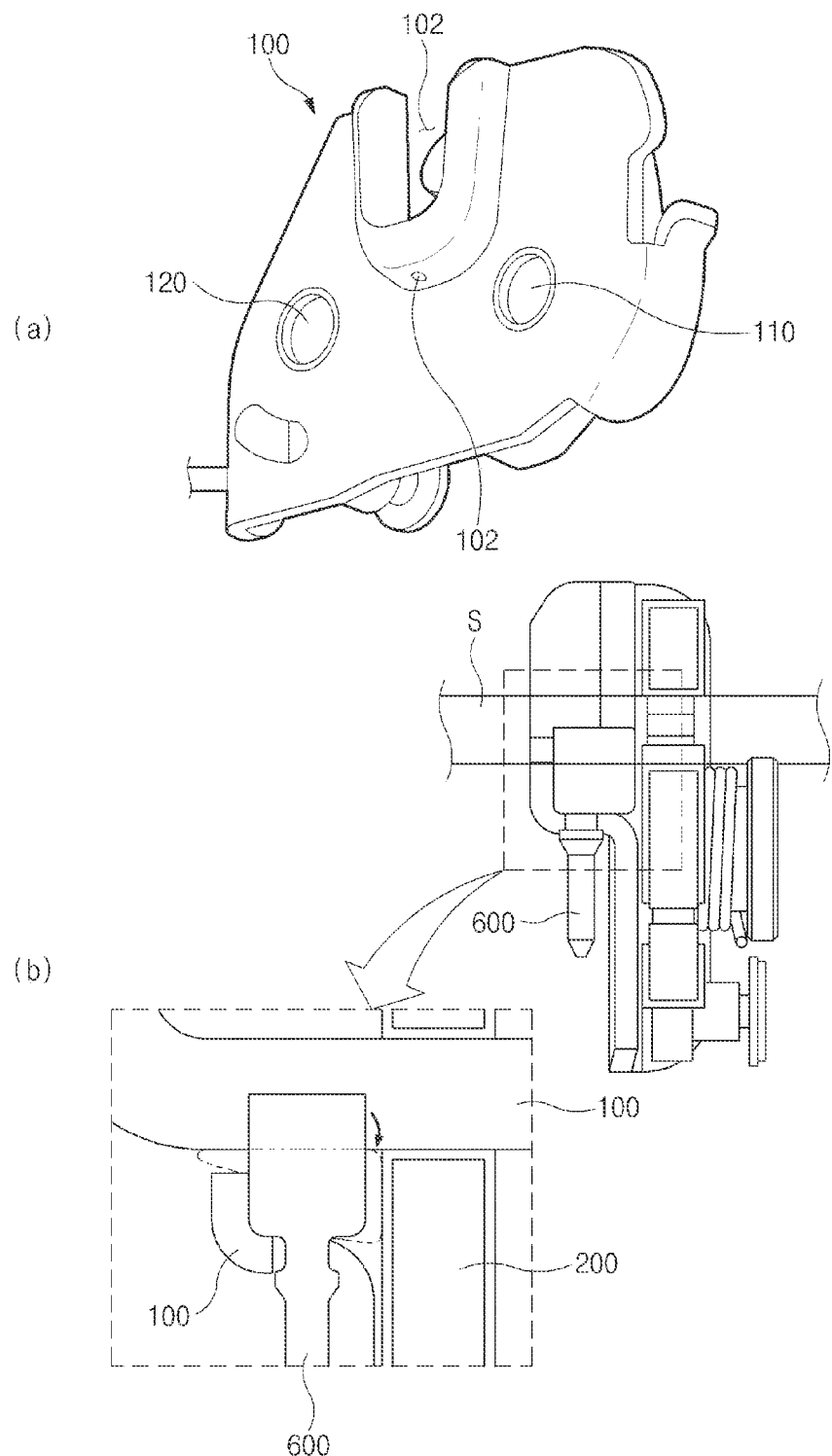
FIG. 5(a) is a view illustrating a base bracket in a seat latch structure according to the present invention.
FIG. 5(b) is a view illustrating a damper that is inserted into a base bracket in a seat latch structure according to the present invention.
Figure 6:
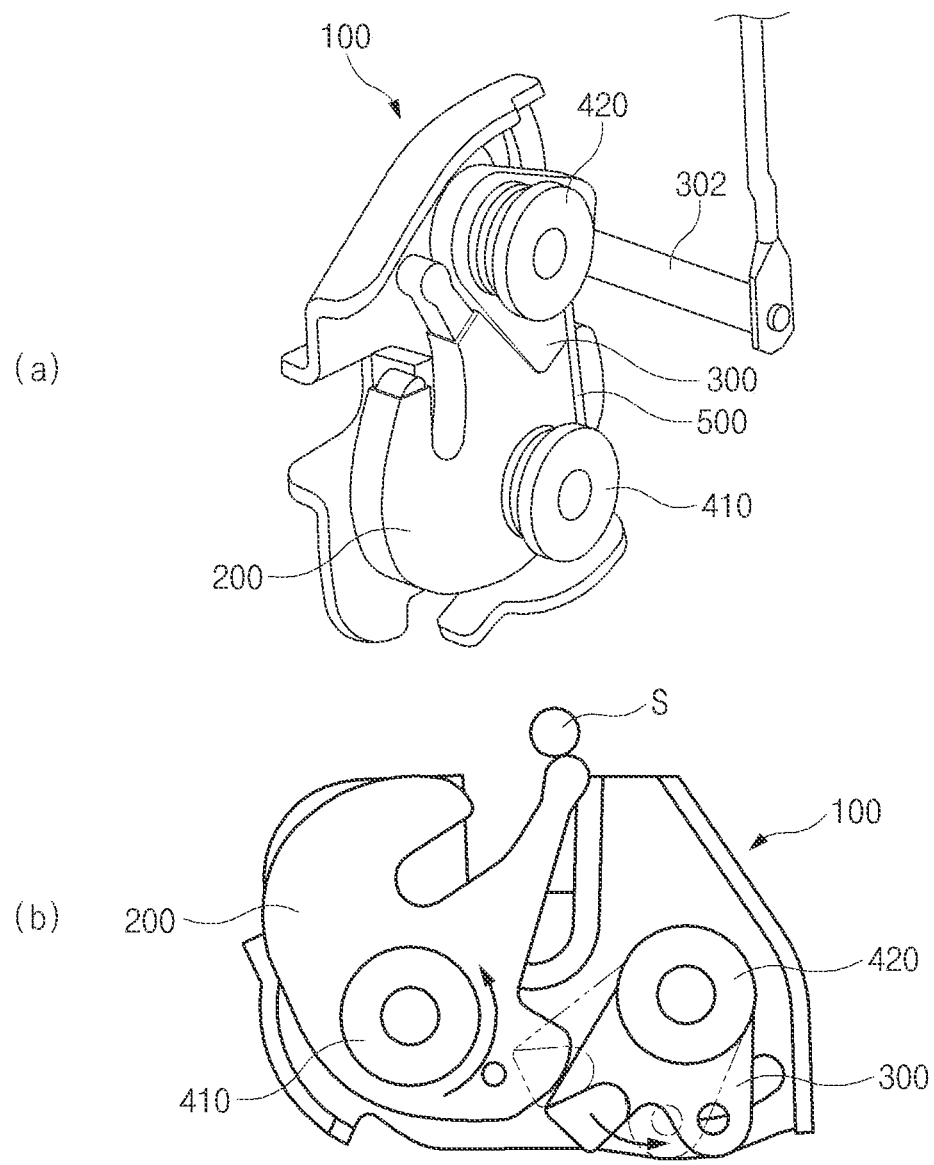
FIG. 6(a) is a view illustrating an operation state of a claw and a pawl in a seat latch structure according to the present invention.
FIG. 6(b) is a cross-sectional view illustrating an operation state of a claw and a pawl in a seat latch structure according to the present invention.

As illustrated in FIG. 3, in a state where the release wire 302 and the pawl 300 are connected together, the double torsion spring 500 is directly connected to the first rotating shaft 410 and the second rotating shaft 420 which are inserted into the claw 200 and the pawl 300, respectively, separately from the connection region of the release wire 302 and the pawl 300. Accordingly, the claw 200 and the pawl 300 can be operated more easily by an elastic force of the double torsion spring 500.

Also, the elastic operation direction of the double torsion spring 500 and the first and second rotating shafts 410 and 420 are positioned on the same axis line, and thus a gap caused by the eccentricity does not occur. Even if tolerance occurs between the outer diameters of the first and second rotating shaft 410 and 420 and the inner diameters of the first and second through-holes 210 and 310, which are formed on the claw 200 and the pawl 300, respectively, it is absorbed by the elastic force of the double torsion spring 500 to minimize the gap, and thus noise occurrence can be reduced.

As illustrated in FIGS. 4(a) and 4(b), the mounting hole 102 is formed on the inside of the opening 101 of the base bracket 100, and the damper 600 of a rubber material is inserted into the mounting hole 102. The damper 600 is positioned between the opening 101 of the base bracket 100 and the locking groove 201 of the claw 200, and as illustrated in FIGS. 5(a) and 5(b), when the striker S is inserted, the damper 600 is deformed by pressure, and thus the claw 200 is prevented from moving left and right.

A lever mounted on the seat frame to move the seat, as illustrated in FIGS. 6(a) and 6(b), is connected to the pawl 300 through the release wire 302 to operate the claw 200. The locking of the seat latch is released through the rotation of the pawl 300.

As described above, the seat latch structure according to various embodiments the present invention includes the base bracket mounted on the vehicle seat and having the first insertion hole and the second insertion hole formed thereon and the opening which is formed on one side thereof and into which the striker fixed to the vehicle body is inserted, the claw having the first through-hole formed thereon to correspond to the first insertion hole and the locking groove formed on one side thereof, the pawl provided on one side of the claw and having the second through-hole formed thereon to correspond to the second insertion hole, the first rotating shaft and the second rotating shaft inserted into the first through-hole of the claw and the second through-hole of the pawl, respectively, and the double torsion spring connecting the first through-hole and the second through-hole into which the first rotating shaft and the second rotating shaft are inserted, respectively. Accordingly, the noise generated during the operation of the seat latch is reduced and the operating force is increased to improve the merchantability.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A seat latch structure comprising:
    a base bracket mounted on a vehicle seat and having a first insertion hole and a second insertion hole, and an opening which is formed on one side thereof and receives therein a striker fixed to a vehicle body;
    a claw having a first through-hole corresponding to the first insertion hole and a locking groove formed on one side thereof;
    a pawl on one side of the claw and having a second through-hole corresponding to the second insertion hole;
    a first rotating shaft and a second rotating shaft inserted into the first through-hole of the claw and the second through-hole of the pawl, respectively; and
    a double torsion spring connecting the first through-hole and the second through-hole into which the first rotating shaft and the second rotating shaft are inserted, respectively;
    wherein a mounting hole is formed inside the opening and extending through the base bracket, and a damper that extends through the mounting hole is positioned between the opening of the base bracket and the locking groove of the claw; and
    wherein the damper is formed of a rubber material, and during insertion of the striker, the damper is deformed and presses the claw to prevent movement of the claw.

2. The seat latch structure according to claim 1, wherein a connection hole is formed on one side of the pawl, and a release wire is inserted into the connection hole to enable the pawl to be rotated.

3. The seat latch structure according to claim 1, wherein the first and second rotating shafts and the double torsion spring are positioned on the same axis line to prevent the occurrence of a gap that is caused by eccentricity.

* * * * *